United States Patent
Sembritzki

(10) Patent No.: US 6,765,982 B2
(45) Date of Patent: Jul. 20, 2004

(54) METHOD OF PRODUCING IMAGES FROM MEASURED COMPUTER TOMOGRAPHIC DATA

(75) Inventor: Otto Sembritzki, Wachenroth (DE)

(73) Assignee: Siemens Aktiengesellschaft, Munich (DE)

( * ) Notice: Subject to any disclaimer, the term of this patent is extended or adjusted under 35 U.S.C. 154(b) by 16 days.

(21) Appl. No.: 10/226,314

(22) Filed: Aug. 23, 2002

(65) Prior Publication Data

US 2003/0043968 A1 Mar. 6, 2003

(30) Foreign Application Priority Data

Aug. 23, 2001 (DE) .......................................... 101 41 344

(51) Int. Cl.$^7$ ................................................ A61B 6/03
(52) U.S. Cl. ............................ 378/4; 378/8; 378/901
(58) Field of Search .......................... 378/4, 8, 15, 901

(56) References Cited

U.S. PATENT DOCUMENTS

| | | | | |
|---|---|---|---|---|
| 4,463,375 A | * | 7/1984 | Macovski ................. | 378/98.12 |
| 6,101,235 A | * | 8/2000 | Zavaljevski et al. ............ | 378/4 |
| 6,463,167 B1 | * | 10/2002 | Feldman et al. ............ | 382/128 |
| 2003/0076988 A1 | * | 4/2003 | Liang et al. ................. | 382/131 |

FOREIGN PATENT DOCUMENTS

DE 198 42 944 A1 7/1999

OTHER PUBLICATIONS

Morneburg, H.: "Bildgebende Systeme für die medizinische Diagnostik", Publicis MCD Verlag, 1995. Seiten 62–67, 137–139, 341–342.

Gonzales R.C.et al.: Digital Image Processing, Addison–Wesley Publishing Co., 1992, Seiten 270–282.

* cited by examiner

Primary Examiner—David V Bruce
(74) Attorney, Agent, or Firm—Harness, Dickey & Pierce, P.L.C.

(57) ABSTRACT

A method of producing images with different image characteristics from measured computer tomographic data, includes using a convolution of measured data with a first convolution core, designed to produce the first image characteristic, and subsequent back-projection by which first image data of a first image with the first image characteristic is calculated. The first image data is then subjected to filtering in order to produce second image data of a second image with a second image characteristic. By using the method, the storage requirement and the computing time in the production of images with different image characteristics can be reduced.

20 Claims, 2 Drawing Sheets

METHOD OF PRODUCING IMAGES FROM MEASURED COMPUTER TOMOGRAPHIC DATA

The present application hereby claims priority under 35 U.S.C. §119 on German patent publication number DE 10141344.0 filed Aug. 23, 2001, the entire contents of which are hereby incorporated herein by reference.

FIELD OF THE INVENTION

The present invention generally relates to a method of producing images with different image characteristics from measured computer tomographic data. Preferably it relates to one in which, by use of convolution of the measured data with a first convolution core, which is designed to produce the first image characteristic, and subsequent back-projection, first image data $B_1$ $(x_i, y_i)$ of a first image with the first image characteristic is calculated.

BACKGROUND OF THE INVENTION

A computer tomograph comprises, inter alia, an X-ray tube, X-ray detectors arranged in rows and a patient couch. The X-ray tube and the X-ray detectors are arranged on a gantry, which rotates around the patient couch and an examination axis running parallel to the latter. As an alternative to this, the X-ray detectors can also be arranged on a stationary detector ring around the patient couch, with only the X-ray tube moving with the gantry.

As a rule, the patient couch can be displaced along the examination axis, relative to the gantry. The X-ray tube produces a bundle of rays which widens in a fan shape in a layer plane at right angles to the examination axis. The limitation of this bundle of rays in the direction of the layer thickness is set by the size or the diameter of the focus on the target material of the X-ray tube and one or more stops arranged in the beam path of the bundle of X-rays. In the case of examinations in the layer plane, the bundle of X-rays passes through a layer of an object, for example a layer of a body of a patient who is supported on the patient couch, and strikes the X-ray detectors located opposite the X-ray tube. The angle at which the bundle of X-rays passes through the layer of the body of the patient, and, if appropriate, the position of the patient couch relative to the gantry change continuously during the recording of the image with the computer tomograph.

During the measurement with such a computer tomograph, a plurality of sets of measured data are obtained, which correspond to different projections of the respective transradiated layer. A set of projections, which were recorded at different positions of the gantry during the rotation of the gantry around the patient, is designated a scan. The computer tomograph records many projections at various positions of the X-ray source relative to the body of the patient in order to reconstruct an image which corresponds to a two-dimensional layer image of the body of the patient.

For this purpose, the measured data are firstly convoluted with a convolution core which, taking into account the physical relationships and the measurement system, produces specific image characteristics. Then, in order to reconstruct the two-dimensional layer image, it transforms the data into the Cartesian space of the image. This technique is also referred to as filtered back-projection. The convolution cores used during the convolution are drawn up on the basis of the desired image characteristic or are known for a large number of such image characteristics. These image characteristics can be, for example, the highest possible local resolution or good low-contrast detectability. In this case, by using a suitable convolution core, the desired image characteristic can be achieved in the reconstructed layer image.

In many cases, it is necessary to obtain images with different image characteristics from the measured data acquired during one measurement. For example, in many applications, an image with high local resolution is produced from the measured or raw data by use of filtered back-projection. Then, from the same measured data, again by use of filtered back-projection, this time with a different convolution core, an image with a good, low-contrast detectability is calculated and displayed. This requires storage of the measured data for the second image calculation. The storage effort is considerable in this case, on account of the large quantity of projection data sets. Furthermore, because of the large amount of measured data, the second calculation leads to a high computing effort.

SUMMARY OF THE INVENTION

An object of an embodiment of the present invention is to specify a simplified method of producing images with different image characteristics from measured computer tomographic data, which manages with a low memory requirement and a short computing time.

In the method of an embodiment of the present application, the image with the first image characteristic is calculated in a known manner by use of filtered back-projection, via convolution of the measured data with the first convolution core which gives rise to the first image characteristic. The further image with a different image characteristic is, however, not produced by renewed calculation from the raw data, but by applying a two-dimensional filter or convolution core to the image data $B_1$ $(x_i, y_i)$ from the first image. As a result of this subsequent filtering of the first image data $B_1$ $(x_i, y_i)$, second image data $B_2$ $(x_i, y_i)$ are obtained which yield the second image with the different image characteristic. In this case, the two-dimensional filter is selected on the basis of the first convolution core and the desired different image characteristic.

The filter for filtering the first image data is preferably obtained from a back-transformation of the relationship of a second convolution core for measured data, the core being designed to produce the second image characteristic, to the first convolution core into the space of the first image.

As opposed to the known method of image production from the prior art, in the present method of an embodiment of the present application only filtered back-projection is required with the corresponding computing effort. Thus, the measured or raw data can be discarded following this back-projection. Intermediate storage for the production of subsequent images with other image characteristics is no longer required in this case. This leads to a considerable reduction in the storage requirement and to a reduction in the computing time for the display of a second image with a different image characteristic. In addition, the hardware outlay for the back-projection of raw data is reduced accordingly.

Instead of applying a second convolution core to the measured data, in a preferred embodiment of the present method, this second convolution core is used, in conjunction with the first convolution core, to provide or calculate a new convolution core for two-dimensional filtering in the space, that is to say in the coordinate space, of the first image. The second image is then obtained by applying this convolution core or filter to the image data from the first image, which needs a substantially lower amount of storage space than the original raw data. Of course, this filter for the space of the image does not have to be recalculated during the performance of each measurement. Instead, filters already suitable for the different image characteristics and combinations of image characteristics of the first and second image can be provided.

The present method of an embodiment of the present application can be employed particularly advantageously in computer tomographic measurements in which a first image with high local resolution and a second image with good low-contrast detectability are needed.

The calculation of the first image with high local resolution is in this case carried out in a known way with a steepening convolution core. The first image data, attained following back-projection in this case, is displayed to the operator of the computer tomograph in the conventional way. Then—or else during the image display—this image data is subjected to filtering with a filter which is obtained from a transformation of the relationship of the first convolution core to a second, smoothing convolution core in the space of the image. Of course, this filter must be adapted appropriately to the image grid, that is to say the spacing of the pixels in the first and second images, and expanded to two dimensions. This can be done, for example via a known interpolation method. Following the application of this filter, which now includes the characteristics of a smoothing convolution core, the second image data is obtained, which yield an image with a good low-contrast detectability.

In a further preferred embodiment, the filter applied in the space of the image is further shortened to image-relevant areas before being applied to the first image data, so that the computing time for the filtering can be reduced once more. The shortening of this filter or convolution core is of course carried out only to such an extent that no undesired artifacts occur in the image area of interest.

Of course, the present method of an embodiment of the present application can also be applied to the production of images with other image characteristics. Suitable convolution cores for measured data, which are often matched to different areas of the body, are known to those skilled in the art from the prior art. Alternatively, it is also possible for those skilled in the art to create appropriate new convolution cores with the desired characteristics from known convolution cores.

BRIEF DESCRIPTION OF THE DRAWINGS

The present invention will be explained briefly once more below by using an exemplary embodiment in connection with the drawings, in which.

DETAILED DESCRIPTION OF THE PREFERRED EMBODIMENTS

Figure 1:
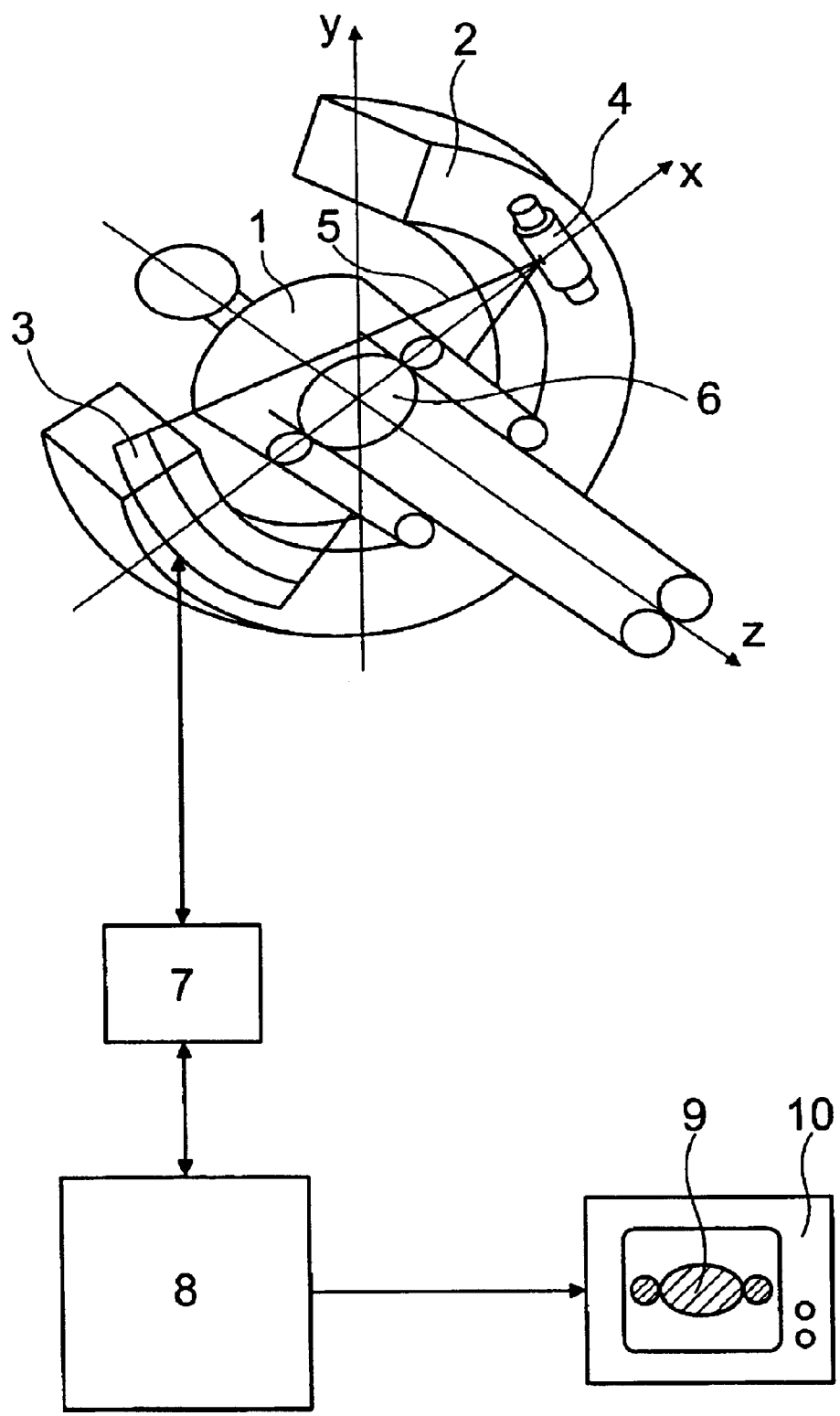
FIG. 1 shows a schematic view of part of a computer tomograph for obtaining section images of a layer of a body of a patient.

FIG. 1 shows a schematic view of part of a computer tomograph to illustrate the geometric relationships when recording the measured data. The computer tomograph has an X-ray source in the form of an X-ray tube 4 which emits a fan-shaped bundle of X-rays 5 in the direction of a detector bank 3, including a large number of detector elements arranged beside one another. The distance between the detector elements of this detector bank 3 also determines the resolution of the subsequent layer image. Both the X-ray tube 4 and the detector bank 3 are arranged on a gantry 2, which can rotate continuously around a patient 1. The patient lies on a couch, not illustrated in FIG. 1, which extends into the gantry 2. The gantry 2 rotates in an x-y plane of a Cartesian coordinate system x-y-z which is indicated in FIG. 1 and corresponds to the space of the layer image to be produced. The patient couch can move along the z-axis. The figure also reveals the layer 6 of the patient 1 which is transradiated by the bundle of X-rays 5 and of which a layer image is to be produced.

In this case, FIG. 1 shows an instantaneous recording of a projection in which, by registering the voltage signals on the detectors of the detector bank 3, a first set of measured data about the layer 6 of the body of the patient is obtained. By rotating the X-ray tube 4 with the opposite X-ray detectors about the z-axis, a large number of projections with corresponding measured data are obtained, from which a two-dimensional layer image can be reconstructed. The measured data are supplied via the control system 7 of the computer tomograph to an image computer 8, which creates a two-dimensional layer image 9 via a filtered back-projection and displays it on a monitor 10.

Figure 2:
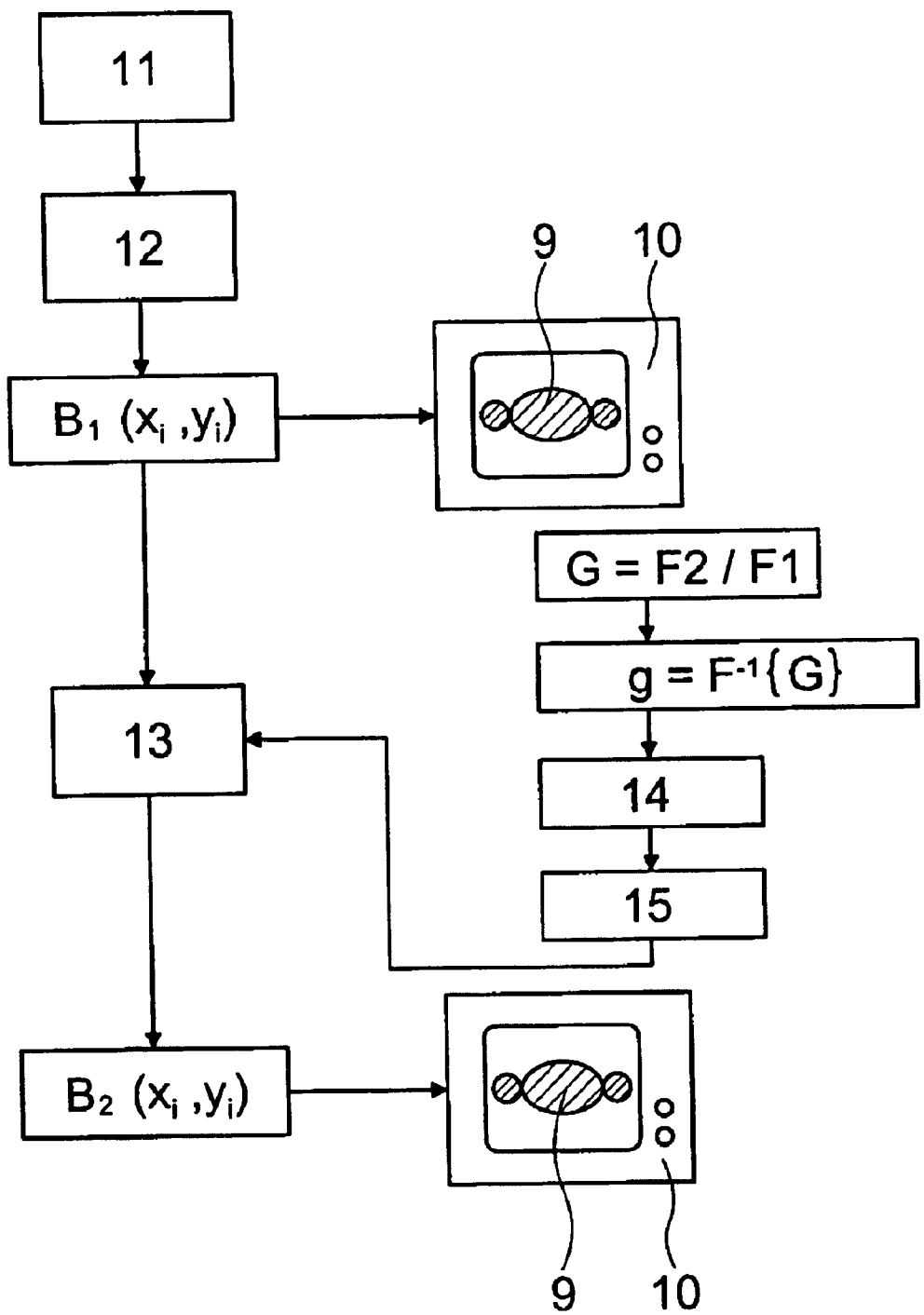
FIG. 2 shows a flowchart for the performance of the present method of producing two layer images with different image characteristics from the measured data from the computer tomograph.

FIG. 2 shows an exemplary flowchart in the production of images with different image characteristics according to the method. For this purpose, the raw data 11 which are obtained from a layer 6 by a measurement with a computer tomograph according to FIG. 1, is subjected to convolution and back-projection into the space of the image, that is to say the x-y plane of FIG. 1, in step 12. For the convolution, a convolution core F1 with the highest level resolution is obtained in order to produce an initial image 9 with the image data $B_1(x_i, y_i)$. This first image $B_1$ is displayed on the monitor 10 in the known way.

Then, in order to display a further image $B_2$ with good low-contrast detectability, the measured data $B_1(x_i, y_i)$ is subjected to filtering in step 13 in order to obtain the image data $B_2(x_i, y_i)$. This image data is in turn displayed on the monitor 10 as layer image 9.

The filter for filtering the image data $B_1(x_i, y_i)$ from the first image $B_1$ is obtained in the following manner in the present example. In this case, as an example, it is assumed that the measured or projection data are present with parallel geometry, as is the case in some of the known computer tomographs. If computer tomographs which do not operate with parallel geometry are employed, the measured data can be converted appropriately to the relationships present in the case of parallel geometry.

While the first image $B_1$ represents a layer image with a high local resolution, the second image $B_2$ to be produced is to be an image with good low-contrast detectability. This can be achieved, for example, by use of the smoothing property of a convolution core F2. The production of the image $B_2$ is in this case carried out by filtering the initial image data $B_1(x_i, y_i)$ with a suitable two-dimensional filter or convolution core. This convolution core is calculated from the additional property of the one-dimensional convolution core F2, which is obtained by the division G=F2/F1. The vector G produced in this way is subjected to Fourier back-transformation into the space of the first image in order to obtain the convolution core $g = F^{-1} \{G\}$.

Then, in step 14, the one-dimensional convolution core g is converted to the local grid of the image $B_1$ and extended rotationally symmetrically to two dimensions. In a computer tomograph employed as an example, in which the detector elements are arranged in a grid of a/2=0.3895 mm, the convolution core g is initially available for the first time at the grid a/2.

In order to achieve the suitable local expansion, this convolution core g has to be converted to the local grid of the image $B_1$. This local grid is predefined in a known way by the number, for example 256×256, and the spacing of the pixels of the monitor image. For the conversion, for example, a linear interpolation of the core g(a/2) to g1d(x) can be carried out. However, a higher-level interpolation is advantageous, since this produces a better image quality. Next, this one-dimensional convolution core g1d(x) is converted rotationally symmetrically to the two-dimensional core g2d_r (x, y). This can likewise be done by using linear interpolation. This convolution core then has its amplitude normalized (step 15).

Finally, using this convolution core g2d_r(x, y), the image B, is convoluted in step 13 in order to obtain the image $B_2$, which has good low-contrast detectability.

$$B_2(x,y)=B_1(x,y)*g2d\_r(x,y).$$

In order to achieve high filtering rates, the two-dimensional convolution core g2d_r(x, y) can be shortened to an image-relevant length before the filtering is carried out.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of producing image data with different image characteristics from measured computer tomographic data, comprising:
   producing a first image characteristic by using filtered back-projection, via a convolution of the measured computer tomographic data with a first convolution core;
   calculating first image data using the produced first image characteristic; and
   obtaining second image data with a second image characteristic, different from the first image characteristic, by subjecting the first image data to filtering using a two-dimensional filter, wherein two-dimensional filter is shortened to an image-relavant length.

2. A method of producing images with different image characteristics from measured computer tomographic data, comprising:
   producing a first image characteristic by convolution of the measured data with a first convolution core;
   calculating first image data of a first image with the first image characteristic; and
   subjecting the first image data to filtering in order to obtain second image data of a second image with a second image characteristic, wherein the step of subjecting the first image data to filtering includes,
   using a two-dimensional filter, obtained from a back-transformation of a relationship of a second convolution core for the measured data designed to produce the second image characteristic, to the first convolution core into the space of the first image.

3. The method as claimed in claim 2, wherein the first convolution core is a steepening convolution core, used to produce an image with relatively high local resolution, and the second convolution core is a smoothing convolution core, used to create an image with relatively good low-contrast detectability.

4. The method as claimed in claim 2, wherein the step of subjecting the first image data to filtering includes the following substeps:
   dividing of the first convolution core by the second convolution core;
   back-transforming a result of the dividing into the space of the first image, in order to obtain a convolution core in this space;
   converting the obtained convolution core to a local grid of the first image and extending the converted convolution core rotationally symmetrically to two dimensions; and
   normalizing an amplitude of the two-dimensional filter obtained in this way.

5. The method as claimed in claim 4, wherein at least one of the conversion to the local grid and the expansion to two dimensions is carried out by interpolation.

6. The method as claimed in claim 2, wherein the two-dimensional filter is shortened to an image-relevant length.

7. The method as claimed in claim 3, wherein the step of subjecting the first image data to filtering includes the following substeps:
   dividing of the first convolution core by the second convolution core;
   back-transforming a result of the dividing into the space of the first image, in order to obtain a convolution core in this space;
   converting the obtained convolution core to a local grid of the first image and extending the converted convolution core rotationally symmetrically to two dimensions; and
   normalizing an amplitude of the two-dimensional filter obtained in this way.

8. The method as claimed in claim 4, wherein at least one of the conversion to the local grid and the expansion to two dimensions is carried out by interpolation.

9. The method as claimed in claim 3, wherein the two-dimensional filter is shortened to an image-relevant length.

10. The method as claimed in claim 4, wherein the two-dimensional filter is shortened to an image-relevant length.

11. The method as claimed in claim 5, wherein the two-dimensional filter is shortened to an image-relevant length.

12. The method as claimed in claim 2, wherein the first image characteristic is produced by using filtered back-projection, via a convolution of the measured data with the first convolution core.

13. The method as claimed in claim 2, wherein the second image characteristic is different from the first image characteristic.

14. The method as claimed in claim 2, wherein the two-dimensional filter is selected based upon the first convolution core and a desired different image characteristic as the second image characteristic.

15. An apparatus for producing image with different image characteristics from measured computer tomographic data, comprising:
   first means for producing a first image characteristic by using filtered back-projection via a convolution of the measured computer tomographic data with a first convolution core;
   second means for calculating first image data using the produced first image characteristic; and third means for obtaining second image data with a second image characteristic, different from the first image characteristic, by subjecting the first image data to filtering, wherein the third means includes a two-dimensional filter, and wherein the two-dimensional filter is one obtained from a back-transformation of a relationship of a second convolution core for the measured data designed to produce the second image characteristic, to the first convolution core into the space of the first image.

16. A method of producing image data with different image characteristics from measured computer tomographic data, comprising:

producing a first image characteristic by using filtered back-projection, via a convolution of the measured computer tomographic data with a first convolution core;

calculating first image data using the produced first image characteristic; and obtaining second image data with a second image characteristic, different from the first image characteristic, by subjecting the first image data to filtering using a two-dimensional filter, wherein the two-dimensional filter is one obtained from a back-transformation of a relationship of a second convolution core for the measured data, designed to produce the second image characteristic, to the first convolution core into the space of the first image.

17. The method as claimed in claim 16, wherein the two-dimensional filter is selected based upon the first convolution core and a desired different image characteristic as the second image characteristic.

18. The method as claimed in claim 16, wherein the first convolution core is a steepening convolution core, used to produce an image with relatively high local resolution, and the second convolution core is a smoothing convolution core, used to create an image with relatively good low-contrast detectability.

19. The method as claimed in claim 16, wherein the step of obtaining second image data with a second image characteristic by subjecting the first image data to filtering includes the following substeps:

dividing of the first convolution core by the second convolution core;

back-transforming a result of the dividing into the space of the first image, in order to obtain a convolution core in this space;

converting the obtained convolution core to a local grid of the first image and extending the converted convolution core rotationally symmetrically to two dimensions; and normalizing an amplitude of the two-dimensional filter obtained in this way.

20. The method as claimed in claim 19, wherein at least one of the conversion to the local grid and the expansion to two dimensions is carried out by interpolation.

* * * * *